US011975265B2

(12) United States Patent
Jeong

(10) Patent No.: US 11,975,265 B2
(45) Date of Patent: May 7, 2024

(54) APPARATUS AND METHOD FOR PROVIDING GAME

(71) Applicant: NEXON KOREA CORPORATION, Gyeonggi-do (KR)

(72) Inventor: Hyera Jeong, Suwon-si (KR)

(73) Assignee: NEXON KOREA CORPORATION, Seongnam-si (KR)

( * ) Notice: Subject to any disclaimer, the term of this patent is extended or adjusted under 35 U.S.C. 154(b) by 107 days.

(21) Appl. No.: 16/984,265

(22) Filed: Aug. 4, 2020

(65) Prior Publication Data
US 2021/0038990 A1    Feb. 11, 2021

(30) Foreign Application Priority Data
Aug. 5, 2019  (KR) .................. 10-2019-0094985

(51) Int. Cl.
A63F 13/58 (2014.01)
A63F 13/44 (2014.01)
A63F 13/533 (2014.01)
A63F 13/79 (2014.01)

(52) U.S. Cl.
CPC .............. *A63F 13/58* (2014.09); *A63F 13/44* (2014.09); *A63F 13/533* (2014.09); *A63F 13/79* (2014.09)

(58) Field of Classification Search
CPC .......... A63F 13/58; A63F 13/79; A63F 13/44; A63F 13/533; A63F 13/822; A63F 13/85; A63F 13/537; A63F 2300/5553; A63F 2300/535
See application file for complete search history.

(56) References Cited

U.S. PATENT DOCUMENTS

| 2014/0067953 | A1* | 3/2014 | Weinstein ............. G06Q 50/01 709/204 |
| 2019/0291004 | A1* | 9/2019 | Andall .................. A63F 13/798 |
| 2020/0398166 | A1* | 12/2020 | Kwon ..................... A63F 13/79 |

FOREIGN PATENT DOCUMENTS

| JP | 2014-102739 A | 6/2014 |
| JP | 2015-66074 A | 4/2015 |
| JP | 2019-71999 A | 5/2019 |
| KR | 10-0371853 B1 | 2/2003 |
| KR | 10-2004-0087636 A | 10/2004 |
| KR | 10-2019-0044316 A | 4/2019 |

OTHER PUBLICATIONS

"The City of Heroes Closure", posted Sep. 1, 2012 http://secondtruth.com/2012/09/the-city-of-heroes-closure/ (Year: 2012).*
"Growing buffs for unused characters", Jun. 2014, https://forums.d3go.com/discussion/10896/growing-buffs-for-unused-characters (Year: 2014).*

(Continued)

*Primary Examiner* — James S. McClellan
*Assistant Examiner* — Ross A Williams
(74) *Attorney, Agent, or Firm* — Sughrue Mion, PLLC

(57) ABSTRACT

Disclosed herein are an apparatus and method for providing a game. The apparatus for providing a game includes storage configured to store information about a plurality of characters held by a user in a game, and a controller configured to provide information corresponding to a character, satisfying a predetermined condition among the plurality of held characters, to the user.

17 Claims, 9 Drawing Sheets

(56) References Cited

OTHER PUBLICATIONS

JP 2019-071999, machine translation (Year: 2019).*
"Name Release Policy—Feedback and Suggestions", May 22, 2019 https://forums.homecomingservers.com/topic/2060-name-release-policy-feedback-and-suggestions/ (Year: 2019).*
Look, "Jung Tuck Gu", URL: https://lineagerm.plaync.com/board/server/view?articleid=5c6ae0bfd54e640001668124, Feb. 19, 2019 (6 pages total).

* cited by examiner

FIG. 8

| Character | Unconnected period (810) | Play reward rate (820) (compared to current character) | Growth speed (830) | Suitability (840) | Growth event (850) |
|---|---|---|---|---|---|
| Character A | 70 days | 10% | 4 | 42 | not in progress |
| Character B | 60 days | −7% | 8 | 57 | in progress |
| Character C | 100 days | 9% | 5 | 83 | not in progress |

APPARATUS AND METHOD FOR PROVIDING GAME

CROSS-REFERENCE TO RELATED APPLICATION

This application claims the benefit of Korean Patent Application No. 10-2019-0094985 filed on Aug. 5, 2019, which is hereby incorporated by reference herein in its entirety.

BACKGROUND

1. Technical Field

The present invention relates generally to an apparatus and method for providing a game, and more particularly to an apparatus and method for providing a game, which may encourage the use of a character having a low usage rate.

2. Description of the Related Art

Recently, with the development of electronic terminals such as smartphones, it is possible to connect to online game systems and play games anytime and anywhere. Such online game systems can provide various characters for the play of users, and users can play games while controlling the operations of their characters.

In connection with this, Korean Patent No. 10-1475438 entitled "Method and System for Performing Online Game Using Plurality of Characters and Cards Indicative of Effects to Be Applied to Characters" discloses a technology of selecting one character from a character group including a plurality of characters held by a user and using the selected character. In the online game system as disclosed in the prior art document, a user selects specific characters from among a plurality of characters and uses them, and thus only the specific characters are mainly used when a predetermined period has elapsed after the start of a game. In the online game system, as the number of characters held by a user increases, the frequency at which characters other than the main characters are used decreases gradually.

As described above, in the conventional online game systems, even when a user has various types of characters, only a main use character or a specific character based on a character usage pattern is used, and thus a problem arises in that various characters are not sufficiently utilized in a game.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

SUMMARY

Objects of embodiments disclosed herein are to provide an apparatus and method for providing a game, which may encourage the use of a character having a low usage rate.

Objects of embodiments disclosed herein are to provide an apparatus and method for providing a game, which may increase the utilization of character resources that are provided in a game.

Objects of embodiments disclosed herein are to provide an apparatus and method for providing a game, which may secure the diversity of characters in a game by allowing a user to use various character resources.

As a technical solution for accomplishing at least one of the above objects, according to one embodiment, there is provided an apparatus for providing a game, the apparatus including: storage configured to store information about a plurality of characters held by a user in a game; and a controller configured to provide information corresponding to a character, satisfying a predetermined condition among the plurality of held characters, to the user.

According to another embodiment, there is provided a method of providing a game, the method being performed by an apparatus for providing a game, the method including: selecting a character satisfying a predetermined condition among a plurality of held characters for a user having the plurality of held characters; and providing information about the selected character to the user.

According to still another embodiment, there is provided a non-transitory computer-readable storage medium having stored thereon a computer program that, when executed by a processor, causes the processor to execute a method of providing a game, wherein the method includes selecting a character satisfying a predetermined condition among a plurality of held characters for a user having the plurality of held characters, and providing information about the selected character to the user.

According to still another embodiment, there is provided a computer program, the computer program being executed by an apparatus for providing a game and stored in a medium to perform a method of providing a game, wherein the method includes selecting a character satisfying a predetermined condition among a plurality of held characters for a user having the plurality of held characters, and providing information about the selected character to the user.

BRIEF DESCRIPTION OF THE DRAWINGS

The above and other objects, features, and advantages of the present invention will be more clearly understood from the following detailed description taken in conjunction with the accompanying drawings, in which:

FIG. 8 is a view illustrating the selection of a character from among unused characters according to an embodiment.

DETAILED DESCRIPTION

Figure 1:
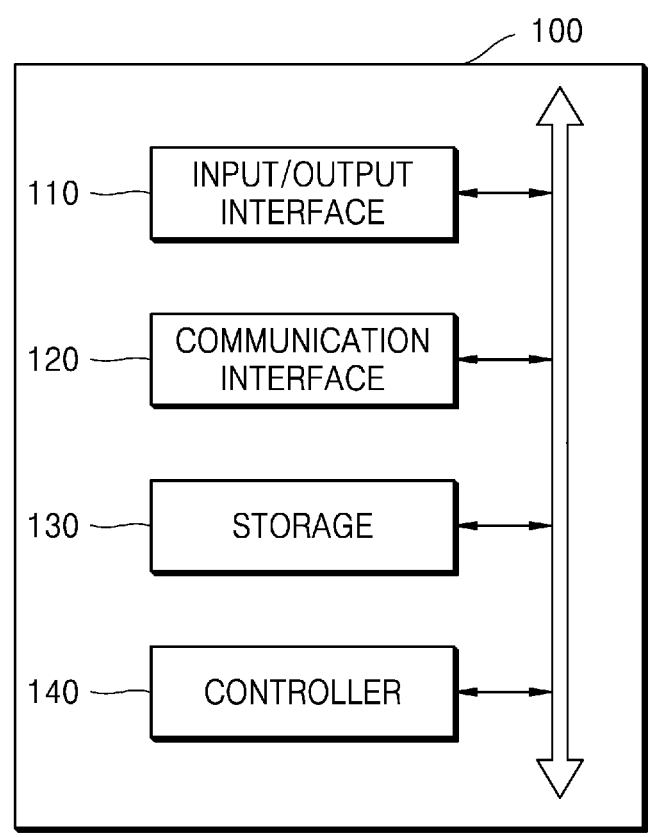
FIG. 1 is a block diagram showing an apparatus for providing a game according to an embodiment.

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is 'directly connected' to the other component but also a case where the one component is "connected to the other component with a third component disposed therebetween." Furthermore, when one portion is described as "including" one component, this does not mean that the portion does not exclude another component but means that the portion may further include another component, unless explicitly described to the contrary.

The embodiments will be described in detail below with reference to the accompanying drawings.

Prior to the following description, the meanings of the terms used below will be defined first.

The term "character" refers to a fictional character appearing in a game space, and refers to an object controlled by each user and a subject performing game operations. Each character is visualized as a two- or three-dimensional graphic image, and is defined by various attributes. In this case, the attributes of a character may include a role, a level, an ability point, a ranking, reputation, a rating, and an experience point.

The term "held character" refers to a character that is given to or acquired by a user in a game. A held character may be defined as a player character (PC), and refers to a character that is directly controlled by a user for the play of a game. Such a held character may be managed via a user account or the like. In particular, a plurality of held characters may be managed via a single user account.

The term "unused character" refers to a character having a low usage rate among a plurality of characters held by a user. Accordingly, an unused character may include a character the usage rate of which is less than a predetermined reference value. In this case, the usage rate may be set according to the usage time of a character (or the number of times that the corresponding character is used) based on the access time (or an access period) for which a user is connected to a game.

The term "main use character" refers to a character that has been most frequently used for play by a user having accessed a game among characters held by the user. A main use character is a character that is most frequently used to play a game among a plurality of held characters, and may be a character that is selected directly by a user. For example, a main use character may be a character having the highest usage rate. Accordingly, a main use character may be a character having the longest play time of a user connected to a game, or a character having the longest play time of a user during a previous predetermined period before the time when the user accessed the game finally.

The terms requiring descriptions, other than the terms defined above, will be separately described below.

FIG. 1 is a block diagram showing an apparatus 100 for providing a game according to an embodiment.

As shown in FIG. 1, the apparatus 100 for providing a game stores various types of information required for the provision of a game, and detects and records various events occurring in the game, thereby enabling the time-series progression of the game. As described above, the function of providing the game may be implemented as a separate device, may be connected to a device in which a game function is implemented via communication, or may be implemented as a separate device and contained in the apparatus 100 for providing a game.

The apparatus 100 for providing a game as described above may be implemented as an electronic terminal on which a game application is installed, or may be implemented as a server-client system. When the apparatus 100 for providing a game is implemented as a server-client system, the apparatus 100 for providing a game may include an electronic terminal on which a client for interaction with a user is installed.

In this case, the electronic terminal may be implemented as a computer, a portable terminal, a television, a wearable device, or the like that includes an interface capable of interaction with a user. In this case, the computer includes, e.g., a notebook, a desktop, a laptop, and the like each equipped with a web browser. The portable terminal is, e.g., a wireless communication device capable of guaranteeing portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, a Mobile Worldwide Interoperability for Microwave Access (mobile WiMAX) terminal, and the like. Furthermore, the television may include an Internet Protocol Television (IPTV), an Internet Television (Internet TV), a terrestrial TV, a cable TV, and the like. Moreover, the wearable device is an information processing device of a type which can be directly worn on a human body, such as a watch, glasses, an accessory, clothing, shoes, or the like, and can access a remote server or be connected to another terminal directly or via another information processing device over a network.

Furthermore, the server of the server-client system may be implemented as a computing device capable of communicating with an electronic terminal on which a client is installed over a network, and may include a storage device capable of storing data or store data through a third server (not shown).

The apparatus 100 for providing a game may include an input/output interface 110, a communication interface 120, storage 130, and a controller 140.

The input/output interface 110 may include an input interface configured to receive input from a user, and an output interface configured to display information such as the results of performance of a task, the status of the apparatus 100 for providing a game, etc. For example, the input/output interface 110 may include an operation panel configured to receive user input, and a display panel configured to display screens.

More specifically, the input interface may include devices capable of receiving various types of user input, such as a keyboard, physical buttons, a touch screen, a camera, or a microphone. Furthermore, the output interface may include a display panel, a speaker, etc. However, the input/output interface 110 is not limited thereto, but may include configurations capable of supporting various types of input and output.

The input/output interface 110 may receive user input for managing characters in the game, in which case the user input may include various user inputs for the use or manipulation of the characters.

Meanwhile, the communication interface 120 may perform wired/wireless communication with another device or the network. For this purpose, the communication interface 120 may include a communication module that supports at least one of various wired/wireless communication methods. For example, the communication module may be implemented in the form of a chipset.

The wireless communication supported by the communication interface 120 may be, for example, Wireless Fidelity (Wi-Fi), Wi-Fi Direct, Bluetooth, Ultra-Wide Band (UWB), Near Field Communication (NFC), or the like. Furthermore, the wired communication supported by the communication interface 130 may be, for example, Universal Serial Bus (USB), High Definition Multimedia Interface (HDMI), or the like. The above-described communication is merely examples, and there may be applied various types of communication techniques that enable the apparatus 100 for providing a game to communicate.

Meanwhile, various types of data such as files, applications, and programs may be installed and stored in the storage 130.

Data stored in the storage 130 may be accessed and used by the controller 140 to be described later, or new data may be stored by the controller 140. The storage 130 may store information about characters, and may store information about the characters held for each user. In this case, the storage 130 may manage the characters held by each user in a user account.

Furthermore, the storage 130 may store programs that may be executed by the controller 140. Such a program may provide the functions of managing characters held by a user, selecting a character satisfying a predetermined condition from among characters held by a user, and providing the information of the selected character.

Meanwhile, the controller 140 may control the overall operation of the apparatus 100 for providing a game, and may include a processor such as a CPU. The controller 140 may control other components included in the apparatus 100 for providing a game input/output interface 110 so that they perform an operation corresponding to the received user input.

For example, the controller 140 may execute a program stored in storage 130, may read data stored in storage 130, and may store new data in the storage 130.

According to an embodiment, the controller 140 may provide a character to a user for the purpose of progression of the game, and may provide a character to a user based on acquisition, purchase, reward, exchange, synthesis, or the like associated with the user. The controller 140 may manage a character provided to a user as a held character by using a user account of the corresponding user. Furthermore, when a plurality of held characters is provided to a single user, the controller 140 may manage a plurality of held characters in a user account of the corresponding user.

The controller 140 may select a character that satisfies a predetermined condition. Furthermore, the controller 140 may provide information about the selected character to a user.

First, the controller 140 determines whether a user in question is a long-term non-connecting user who has not connected to the game for a predetermined period or more. In this case, the predetermined period may be variously set, and may be set to a period sufficient to determine that a user has left the game, e.g., 60 days, 90 days, 180 days, 365 days (1 year), or the like. If the user is a long-term non-connecting user, the controller 140 may select a main use character that satisfies a condition in which the usage rate is equal to or higher than a predetermined reference value for the user. In contrast, when the user is not a long-term non-connecting user, the controller 140 may select an unused character that satisfies a condition in which the usage rate is lower than the predetermined reference value from the user.

The controller 140 may calculate the usage rate of a character according to character usage time (or the number of times that the corresponding character is used) based on game access time (or a game access period). For example, the controller 140 may calculate the usage rate as 50% when the total game access time (or access time during June) of a user is 100 hours and the play time using character A is 50 hours, and may calculate the usage rate as 0.005% when the play time using character B is 30 minutes. The controller 140 may select a character, the usage rate of which is significantly lower than other characters, such as character B, as an unused character. Furthermore, the controller 140 may select a character, which has never been used for play, as an unused character.

As described above, the usage rate of a character is information indicating the degree of use of the character in a game.

Furthermore, the predetermined condition may be set based on the game access period of a user and the usage rate of a character by the user.

Through this, the controller 140 may encourage a long-term non-connecting user to return to the game by providing information about a main use character to the user. Furthermore, the controller 140 may request a user who is not a long-term non-connecting user to use an unused character having a low usage rate by providing information about the unused character to the user.

Figure 2:
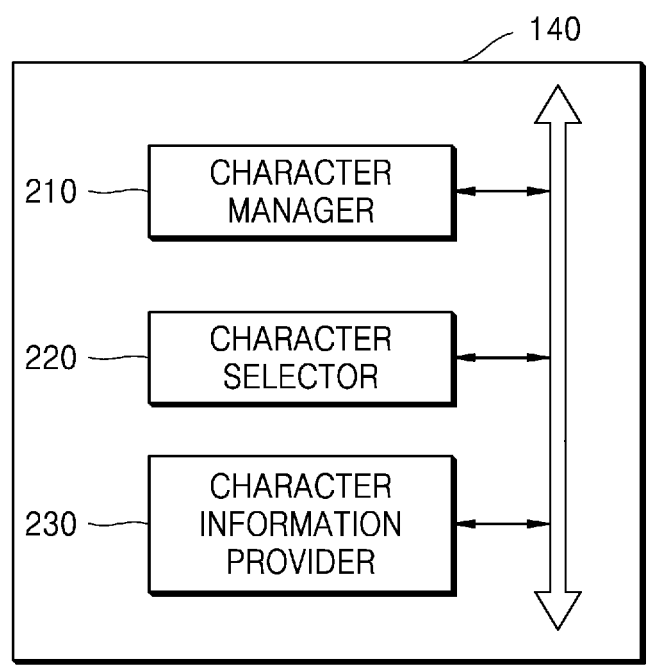
FIG. 2 is a block diagram showing a controller according to an embodiment.

FIG. 2 is a block diagram showing a controller according to an embodiment.

As shown in FIG. 2, the controller 140 may include a character manager 210, a character selector 220, and a character information provider 230.

The character manager 210 may provide a character to a user, and may manage characters held by the user. The character manager 210 may manage the characters held by a user in a user account. The character manager 210 may manage all types of information related to each character played by a user, such as an experience point, an ability point, a level, a skill, and an item, in each user account. In particular, the character manager 210 may manage information about a connection history (including in-game play time) indicating the usage status of the character.

The character selector 220 searches for the connection history of a user for the game, and determines whether the user is a user who has not connected for a predetermined period based on the connection history of the user.

The character selector 220 may select an unused character, the usage rate of which is lower than a predetermined reference value, for a user who is not a long-term non-connecting user. In this case, the character selector 220 may select the unused character by using the usage rate of the character. For example, the character selector 220 may select a character, the usage rate of which is lower than 1%, i.e., a character rarely used in the play of the game, as an unused character.

Furthermore, in the case of a game in which a character is selected and then the game is accessed, the character selector 220 may select an unused character based on whether access using the character has been made. In this case, the character selector 220 may select an unused character based on connection time for each character. For example, when a first character is selected and then the game is accessed for 100 hours and a second character is selected and then the game is accessed for 30 minutes, the character selector 220 may select the second character (a character for which connection time is shorter than one hour) as an unused character.

Meanwhile, when a user in question is a long-term non-connecting user, the character selector 220 may select the main use character of the corresponding user. The character selector 220 may determine a user who has not accessed the game for a predetermined period (e.g., 60 days) or longer as a non-connecting user.

In this case, the character selector 220 may select a main use character, the usage rate of which is equal to or larger than the predetermined reference value, for the long-term non-connecting user. For example, the character selector 220 may select a character having a usage rate of 50% or higher, i.e., a character used in more than half of the play of the game, as a main use character.

The character selector 220 may select the most frequently used character (i.e., a character having the longest play time) from among characters held by a user as a main use character. When a main use character is directly set by a user, the character selector 220 may select the corresponding character as a main use character. Furthermore, the character selector 220 may select a character, most frequently used during a predetermined period (e.g., 100 days) before the time when a user accesses the game last, from among characters held by a user as a main use character in order to select a main use character before a long-term non-connection.

The character information provider 230 may provide information about the unused character selected for the user who is not a long-term non-connecting user, or may provide information about the main use character selected for the long-term non-connecting user.

First, there will be described a case where the character information provider 230 provides information about an unused character to a user who is not a long-term non-connecting user.

The character information provider 230 may provide information about an unused character in the form of an alarm. For example, the character information provider 230 may provide a message such as "Character A has been sleeping," "Character B has been missing," or "The unconnected period for character A is 60 days. Please connect while using character A" in the form of an alarm.

The character information provider 230 may provide information about an unused character via a character selection window. For example, the character information provider 230 may display information such as "unused character" over the unused character in the character selection window.

Furthermore, the character information provider 230 may provide information about an unused character by applying an effect to the character. For example, the character information provider 230 may apply a frozen effect or a sleeping effect to the unused character.

Through this, the character information provider 230 may encourage the user to play the game using the unused character by providing information about the presence or absence of an unused character and the unused character.

Meanwhile, the character information provider 230 may calculate an unused period for the unused character when providing information about the non-use of the unused character. When providing the information on the unused character, the character information provider 230 may also provide information on the calculated period to the user. For example, the character information provider 230 may output a message including information on an unused period, such as "Character A has been sleeping for 60 days," when issuing an alarm in the form of a message. When there is a plurality of unused characters, the character information provider 230 may select an unused character for recommendation to a user and request the use of the selected unused character.

For example, the character information provider 230 may select an unused character having the highest play reward rate or an unused character having the highest growth rate from among the plurality of unused characters and recommend it. As described above, the character information provider 230 may recommend a character having a higher utilization value in the game.

In this case, the character information provider 230 may also provide a reason for the recommendation of an unused character when providing information about the unused character. For example, when providing information about character A, which is an unused character, the character information provider 230 may also provide a reason for recommendation such as "Character A is a character having a high play reward rate" or "Character A is a character suitable for your play style."

In other words, the character information provider 230 may provide information about an unused character, the unused period of the unused character, and a reason for the recommendation of the unused character (e.g., play reward rate, suitability for the play style of the user, or the like) to a user as information about the non-use of each of one or more unused characters.

The character information provider 230 may select a character having the longest unconnected period or the shortest unconnected period from among a plurality of unused characters and then recommend it. As described above, the character information provider 230 may recommend an unused character which has been unused for a long period or a character the usage rate of which has recently decreased.

The character information provider 230 may analyze the play style of a user. The character information provider 230 may select and recommend an unused character having the highest suitability for the play style of the user based on the play style of the user. When the play style of the user prefers playing collaboratively with other users, the character information provider 230 may recommend an unused character specialized in collaboration (e.g., a character adapted to increase the attack power of a team member during collaboration) among the unused characters of the user. As described above, the character information provider 230 may provide an unused character suitable for the play style by considering the play style of the user.

Furthermore, the character information provider 230 may select an unused character, for which an event is in progress, from among a plurality of unused character and recommend it. In this case, the character information provider 230 may select and recommend an unused character for which an event, such as a growth event (an event in which the growth rate of a character is set to a higher value during a predetermined period) or reward event (an event in which a reward rate for the play of a character is set to a higher value), is in progress. As described above, the character information provider 230 may recommend an unused character for which an event is in progress so that the user may utilize an in-game event in the use of the unused character.

When the use of the unused character is requested by the user, the character information provider 230 may provide various messages based on the final access record of the corresponding unused character. In this case, when the unused character is used by the user, the character information provider 230 may provide an in-game ranking according to the play of the character.

For example, the character information provider 230 may classify an unconnected period as one of two or more types of unconnected periods (e.g., a short-term departure, a mid-term departure, and a long-term departure) based on a final access date (or final access time) for the unused character. For example, the character information provider 230 may classify an unconnected period as one of a first unconnected period (a short-term departure, e.g., an unconnected period for 3 to 5 days), a second unconnected period (a mid-term departure, e.g., an unconnected period for 6 to 30 days), and a third unconnected period (a long-term departure, e.g., an unconnected period for 31 days or more) based on the final access date of the unused character, and may provide different types of information (or different messages) in the respective types of unconnected periods.

In the first unconnected period, the character information provider 230 may provide the ranking information of the character to the user in order to induce the tension of character access. For example, the character information provider 230 may provide a message such as "The ranking of character A was caught up with by that of the character B of XX. Is it OK if the ranking of character A was caught up with by that of the character B of XX?" or "The ranking of character A is 348." As described above, in the first unconnected period, the character information provider 230 may provide the user with information having a faster change speed than other information, such as a change in player vs player (PvP) rankings.

In the second unconnected period, the character information provider 230 provides information about the growth potential of a character in order to continuously encourage the use of the character. The character information provider 230 may provide a message such as "If you use character A, you will receive a return user package," "Only 10 days to grow character A as much as main character C! Please return immediately." As described above, in the second unconnected period, the character information provider 230 may provide the user with information having an intermediate change speed compared to other information, such as information about a reward that has not been received during an unconnected period or a return user package reward that can be received when accessing the game.

In the third unconnected period, the character information provider 230 may provide the user with in-game update information in the unconnected period. For example, the character information provider 230 may provide a message such as "XX, the battle YY and the costume ZZ have been updated for 3 months without access. Check it out." As described above, in the third unconnected period, the character information provider 230 may provide the user with information having a slower change speed than other information, such as an overall change in a game or a character-related change.

As described above, the character information provider 230 may classify an unconnected period as one of the plurality of types of periods based on a final access date for an unused character to continuously encourage play using the unused character, and may provide different types of information adapted to encourage user access in the respective types of unconnected periods. For example, the character information provider 230 may provide information having a change speed proportional to the length of each of the types of unconnected periods, thereby providing high-value information to encourage the user to return to the game based on the unconnected period.

The character information provider 230 may receive a pre-selected main use character from a user. When the unused character is used, the character information provider 230 may calculate growth time based on the growth level of the level, rating and equipment of a main use character, and may provide the user with information on the growth time that the unused character takes to reach the growth level of the main use character.

Furthermore, the character information provider 230 may check the current status of each character, and may recommend equipment, a costume, and a skill required for each character for the purpose of even growth between characters.

For example, character A may be a fighting character (e.g., a character having higher fighting power than other characters), and character B is a costume character (e.g., a character having many costumes). The character information provider 230 may provide character A with information required to increase fighting power (information about equipment for improving fighting power), and may provide character B with information required to decorate a character (information about a costume, or information about a new costume release). Through this, the character information provider 230 provides information for the strengthening of the character characteristics by considering the character characteristics, thereby reflecting the need of the user for each character by considering the character characteristics and also suggesting the direction of the growth of the character.

In contrast, character A may have high fighting power, and character B may have a colorful costume. The character information provider 230 may recommend a costume to character A and fighting equipment to character B, and may also provide information (information about equipment required to increase the fighting power of character B by 20) required to reach the growth level of an opponent character (required for character B (having a fighting power of 2,800) to reach the level of character A (having a fighting power of 3,000)). Through this, the character information provider 230 may induce the even growth of characters held by the user, thereby inducing the use of an unused character and also preventing the occurrence of an unused character.

Next, there will be described a case where the character information provider 230 provides a user with information about a main use character for a long-term unconnected user.

The character information provider 230 may display a message such as "It has been 120 days since the game was accessed. Character A is waiting for the owner" through a screen in order to provide the user with information about a main use character for a long-term unconnected user. Through this, the character information provider 230 may encourage the long-term unconnected user to perform play using the character that was played the most.

Furthermore, the character information provider 230 may collect information updated in a game for the unconnected period of the user, and may provide the collected update information. In this case, the character information provider 230 may select only information related to the characters of a user from the updated information and provide the selected information to the user, or may select only update information important for the growth of characters and provide the selected information to the user. Furthermore, the character information provider 230 may select only update information related to a main use character from updated information and provide the selected information to the user.

Meanwhile, the character manager 210 may make a setting so that when the character manager 210 receives a user request for the use of an unused character from the user, play is performed while using the unused character selected by the corresponding user.

When the unused character is used by the user, the character manager 210 may increase the probability of obtaining an item in the game and providing a reward item by applying a buff adapted to temporarily increase the basic ability of a character to the unused character. Through this, the character manager 210 may encourage the user to use the unused character.

As described above, the apparatus 100 for providing a game may provide the user with information about the presence of a character having a low usage rate, thereby inducing the use of the character having a low usage rate and also increasing the utilization of character resources in the game. Moreover, the diversity of characters may be secured in the game by allowing each user to use various character resources.

Furthermore, the apparatus 100 for providing a game may return a character not used at all due to a user having left the game to the game by alarming the user about information about the presence of a character that was mainly used, and may also allow the character of a long-term unconnected user to be utilized in the game.

Figure 3:
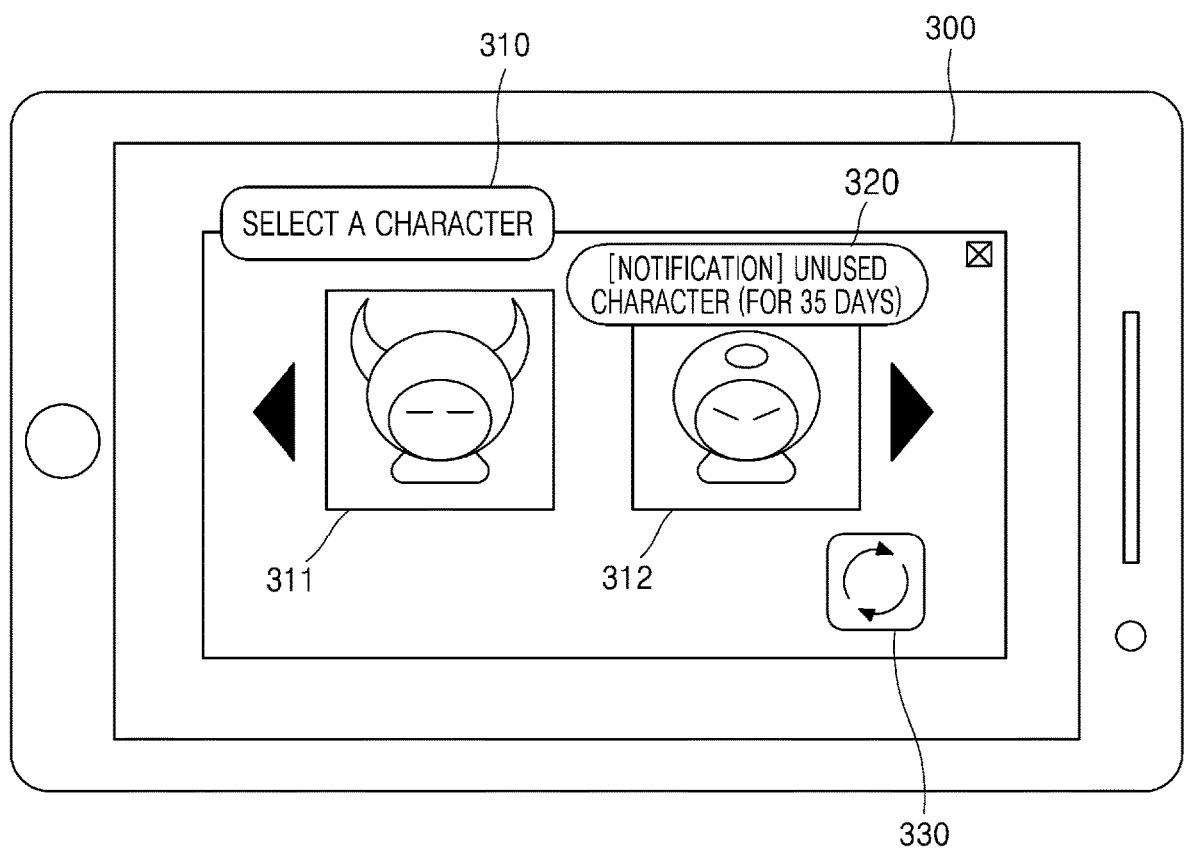
FIG. 3 is a view illustrating an alarm of an unused character in a character selection window according to an embodiment.

FIG. 3 is a view illustrating an alarm of an unused character in a character selection window according to an embodiment.

As shown in FIG. 3, the apparatus 100 for providing a game may display a character selection window 310 on a screen 300. The character selection window 310 is a region where a user selects a character for play from among characters held by the user. The apparatus 100 for providing a game may display a first character 311 and a second character 312 by using the character selection window 310.

The apparatus 100 for providing a game may determine the second character 312 to be an unused character, and may select the second character 312 as an unused character. The apparatus 100 for providing a game may display the information "unused character" over the second character 312 in the form of a label 320. In this case, the apparatus 100 for providing a game may display the information "[Notification] Unused Character (for 35 days)" on the label 320. In this case, the apparatus 100 for providing a game may calculate an unused period for the second character 320, and may include and display information about the calculated period (35 days) in and on the label 320.

The apparatus 100 for providing a game may further include a character change button 330 adapted to receive input for a character change request from the user.

For example, the apparatus 100 for providing a game may make a setting so that when the apparatus 100 for providing a game receives a selection of the second character 312 and input to the character change button 330 from the user, the corresponding user may perform play while using the second character 312.

Figure 4:
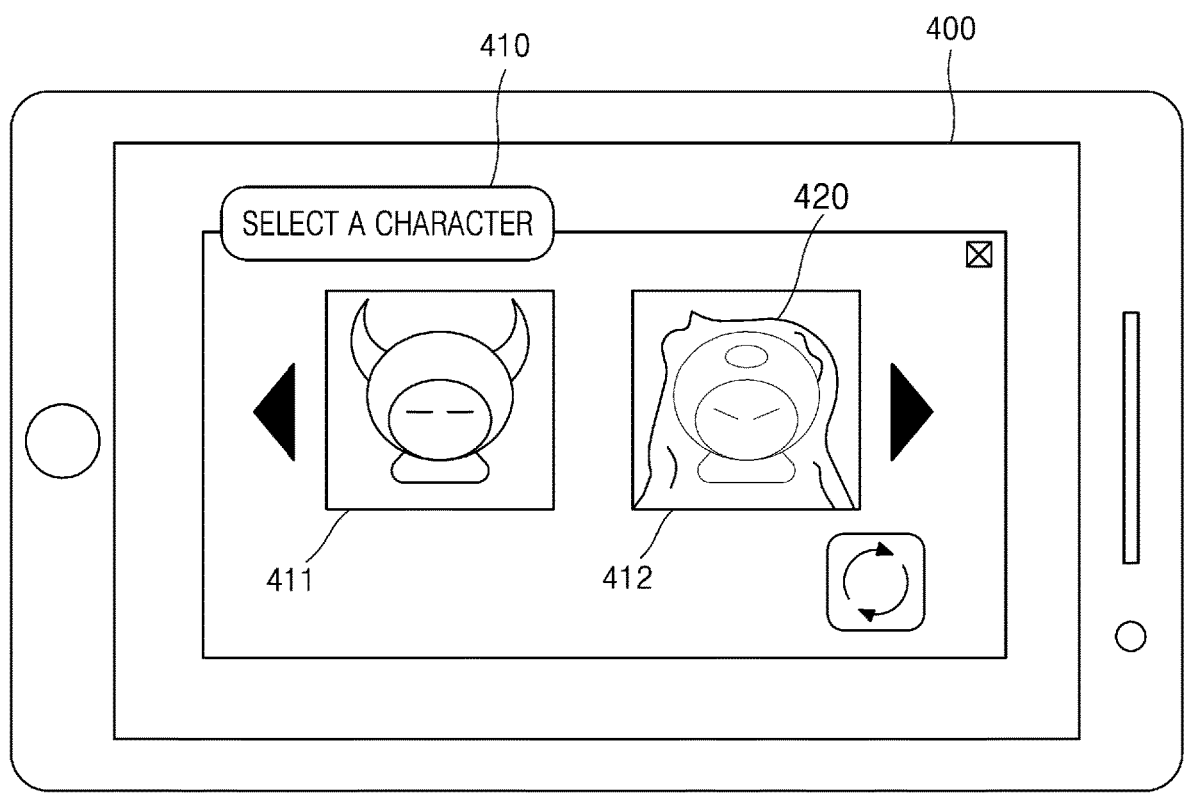
FIG. 4 is a view illustrating an effect applied to an unused character in a character selection window according to an embodiment.

FIG. 4 is a view illustrating an effect applied to an unused character in a character selection window according to an embodiment.

As shown in FIG. 4, the apparatus 100 for providing a game may display a character selection window 410 on a screen 400. The character selection window 410 is a region where a user selects a character for play. The apparatus 100 for providing a game may display a first character 411 and a second character 412 by using the character selection window 410.

Even in this case, the apparatus 100 for providing a game may determine the second character 412 to be an unused character, and may select the second character 412 as an unused character.

The apparatus 100 for providing a game may apply an effect to the second character 412. In other words, the apparatus 100 for providing a game may apply an ice effect 420, i.e., an effect in which the second character 412, which is an unused character, is frozen, and may provide it to the user.

Figure 5:
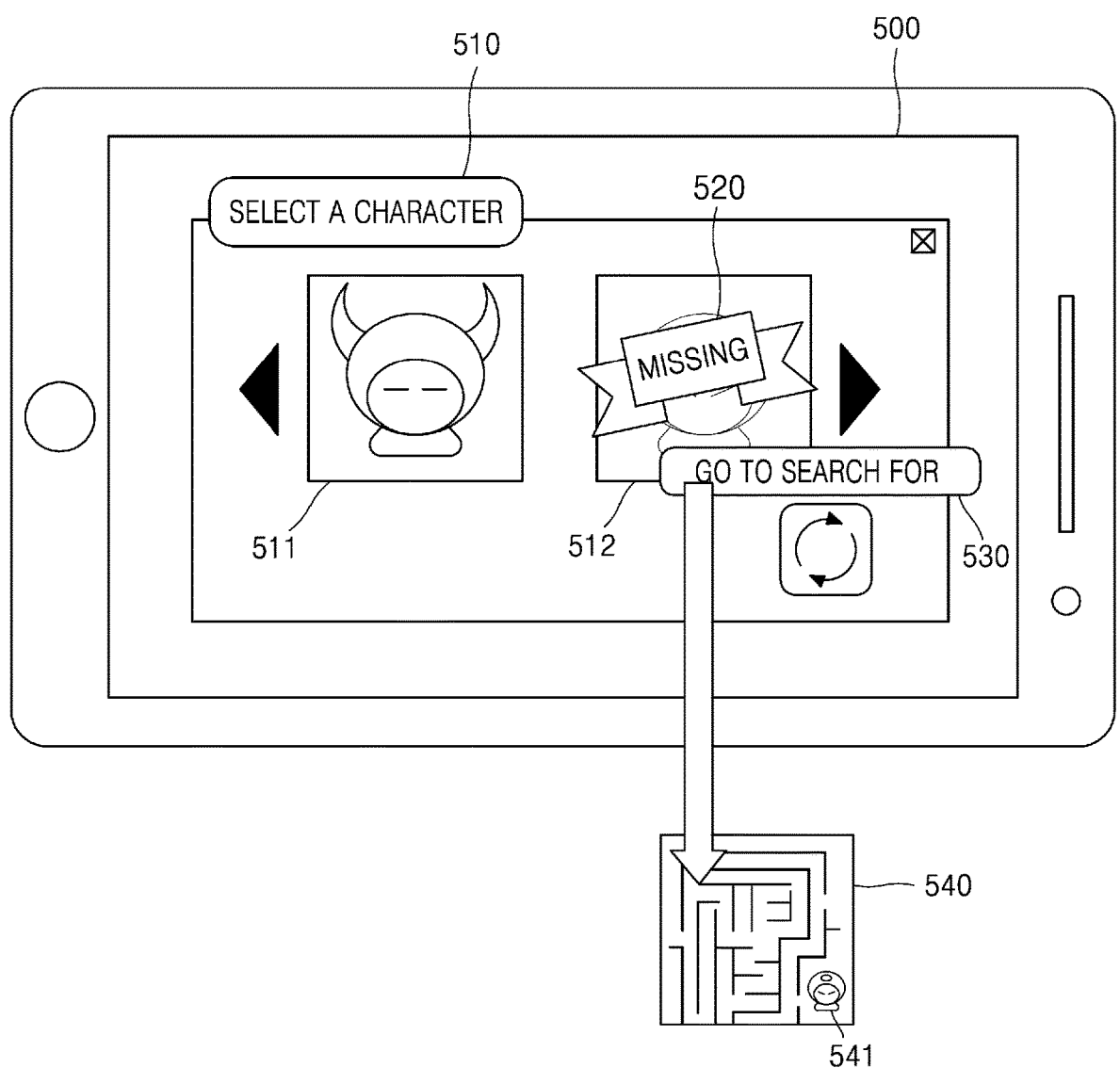
FIG. 5 is a view illustrating letter display related to the unused state of a character in a character selection window according to an embodiment.

FIG. 5 is a view illustrating letter display related to the unused state of a character in a character selection window according to an embodiment.

As shown in FIG. 5, the apparatus 100 for providing a game may display a character selection window 510 on a screen 500. The character selection window 510 is a region where a user selects a character for play. The apparatus 100 for providing a game may display a first character 511 using the character selection window 510. In this case, the apparatus 100 for providing a game may display letters 520, such as "missing," indicating the status of an unused character instead of the unused character on an unused character display window 512.

The apparatus 100 for providing a game may provide a go-to-search-for button 530 adapted to go to search for a missing character together with the letters 520 such as "Missing."

When receiving a selection of the go-to-search-for button 530 from the user, the apparatus 100 for providing a game may provide the user with a simple mini-game 540 such as a maze game designed to go to search for an unused character 541. The apparatus 100 for providing a game may provide a predetermined reward when the unused character 541 is found in the mini-game 540. For example, the apparatus 100 for providing a game may activate unused character search by setting a predetermined reward as a rare item, and may increase the usage rate of an unused character by setting a predetermined reward as an item specialized for the unused character.

As shown in FIGS. 3 to 5, the apparatus 100 for providing a game may provide information about an unused character by using the character selection window. Through this, the apparatus 100 for providing a game may allow the user to view an unused character to which a label or an effect is applied via the character selection window. Furthermore, the apparatus 100 for providing a game may display letters indicating unused status. Through this, the apparatus 100 for providing a game may encourage the user to play the game by using the unused character.

Figure 6:
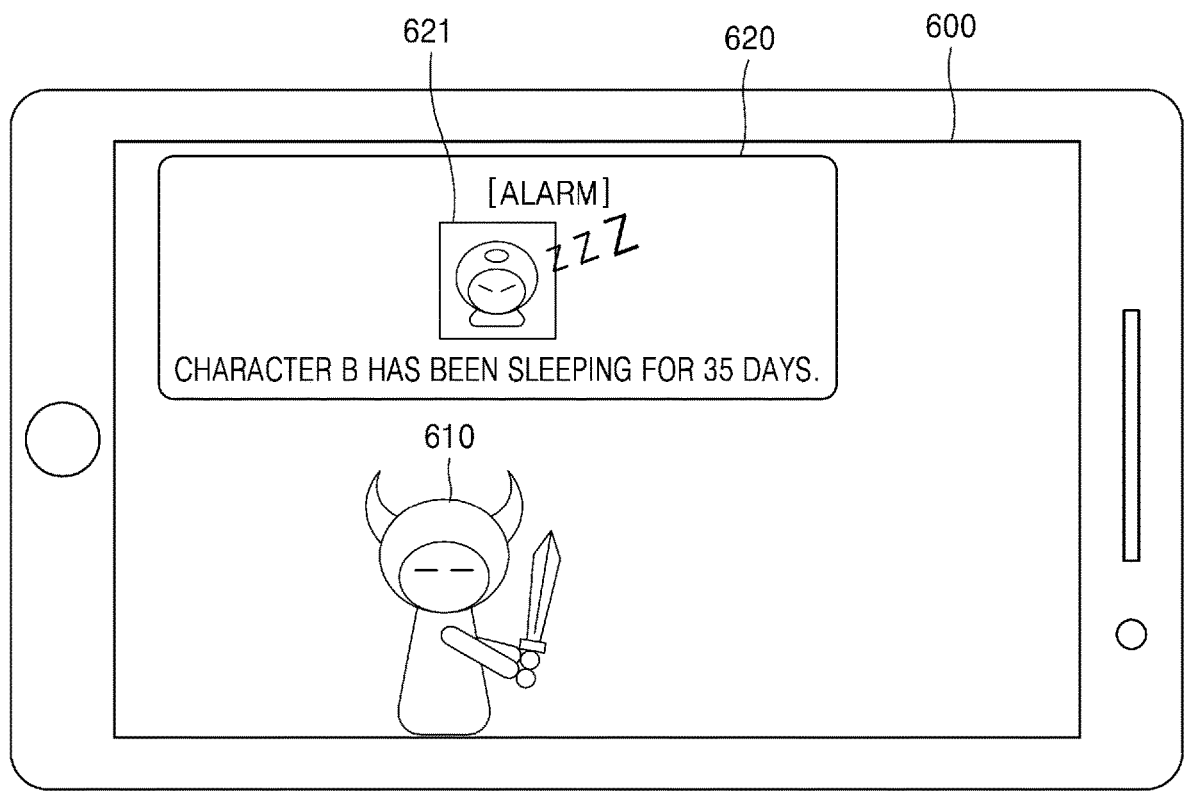
FIG. 6 is a view illustrating the display of an alarm of an unused character during the play of a game according to an embodiment.

FIG. 6 is a view illustrating the display of an alarm of an unused character during the play of a game according to an embodiment.

As shown in FIG. 6. The apparatus 100 for providing a game may display a scene, in which a user plays a game using a first character 610, on a screen 600. In this case, the apparatus 100 for providing a game may determine a second character 621 to be an unused character, and may select the second character 621 as an unused character.

The apparatus 100 for providing a game may provide information about the second character 621, i.e., an unused character, in the form of an alarm 620. In this case, apparatus 100 for providing a game may display the second character 621, i.e., an unused character, together with an alarm message such as "character B has been sleeping for 35 days." Through this, the apparatus 100 for providing a game may allow the user to view the unused character, and may encourage the user to play the game by using the unused character.

Figure 7:
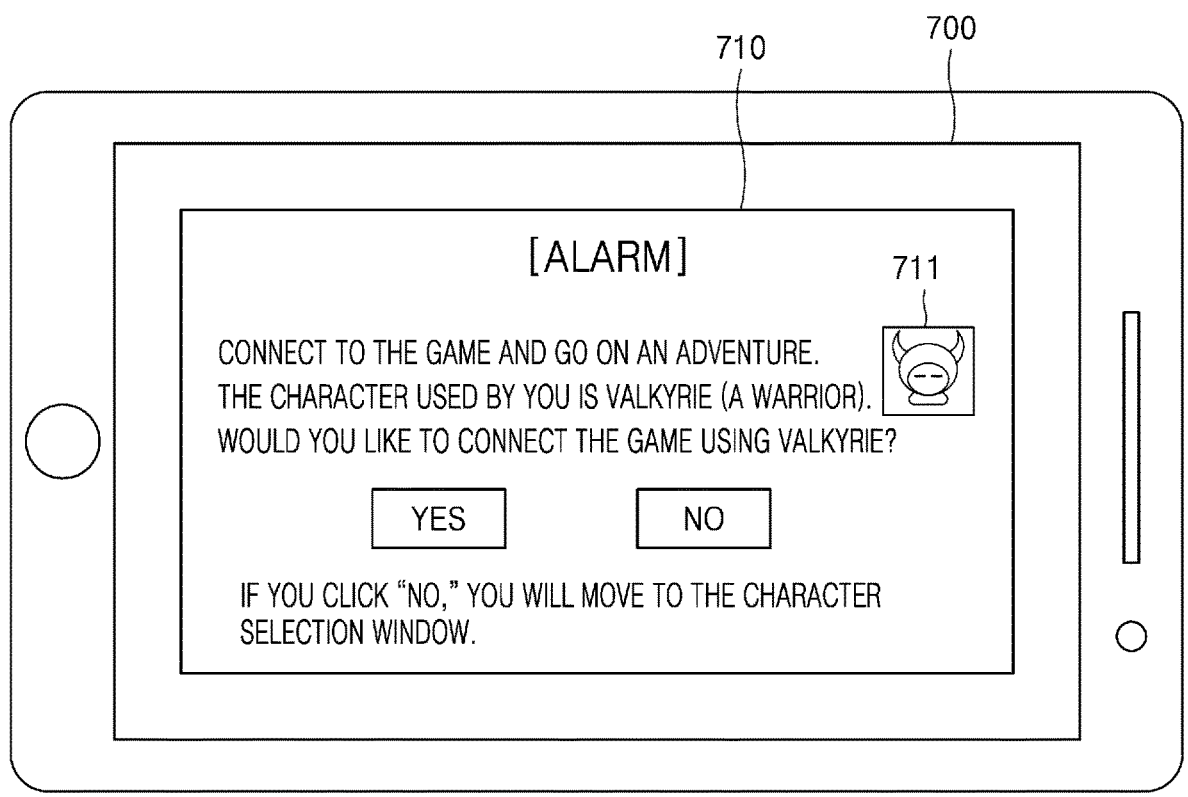
FIG. 7 is a view illustrating the recommendation of a character to a long-term non-connecting user according to an embodiment.

FIG. 7 is a view illustrating the recommendation of a character to a long-term non-connecting user according to an embodiment.

As shown in FIG. 7, the apparatus 100 for providing a game may provide a message adapted to encourage a long-term unconnected customer to access a game on a screen 700. When identifying a long-term unused user, the apparatus 100 for providing a game may identify the main use character 711 of the long-term unused user.

The apparatus 100 for providing a game may provide a message, such as "Connect to the game and go on an adventure. You are a long-term unconnected customer. The character used by you is Valkyrie (warrior). Would you like to connect the game using Valkyrie?," in the form of an alarm 710.

When providing the alarm 710, the apparatus 100 for providing a game may also provide information about the main use character 711 of the long-term unconnected user.

Through this, the apparatus 100 for providing a game may allow a long-term non-connecting user to view information about a main use character that was mainly used to connect to the game, and may encourage the user to rejoin the game using the main use character.

FIG. 8 is a view illustrating the selection of a character from among unused characters according to an embodiment.

As shown in FIG. 8, the apparatus 100 for providing a game displays characters (characters A, B, and C) held by a user in a table 800, more specifically unused characters unconnected for a predetermined period (e.g., 60 days) or longer and selected from among the held characters.

When providing information about an unused character, the apparatus 100 for providing a game may select a specific character from among a plurality of unused characters (characters A, B, and C) and recommend it for the use of the unused character.

For example, the apparatus 100 for providing a game may select an unused character to be recommended to a user based on unconnected periods 810. The game providing device 100 may recommend unused character C having the longest unused period 810 of 100 days to the user. Alternatively, the apparatus 100 for providing a game may recommend unused character B having the shortest unused period 810 of 60 days to the user.

The apparatus 100 for providing a game may select an unused character to be recommended to the user based on play reward rates 820. The apparatus 100 for providing a game may calculate play reward rates 820 based on the character of the user currently being used, and may select an unused character to be recommended based on the calculated values. The apparatus 100 for providing a game may recommend character A, i.e., an unused character having the highest play reward rate 820 of 10%, to the user.

The apparatus 100 for providing a game may select an unused character to be recommended to the user based on growth speeds 830. For example, each of the growth speed 830 is a score that is given between 1 and 10 based on the growth speed of a character. The apparatus 100 for providing a game may recommend character B having the highest growth speed 830 of 8 to the user.

The apparatus 100 for providing a game may select an unused character to be recommended to the user based on suitability levels 840. For example, each of the suitability levels 840 may be a score that is given between 1 and 100 for the degree of suitability based on the play style of the user. The apparatus 100 for providing a game may recommend character C having the highest suitability level 840 of 83 to the user.

The apparatus 100 for providing a game may select an unused character to be recommended to the user based on an event, i.e., a growth event 850. For example, a growth event is in progress only for character B. Accordingly, the apparatus 100 for providing a game may recommend character B, for which the growth event 850 is in progress, to the user. Although the growth event is described as an example in this case, an unused character may be selected based on various events other than the growth event.

Figure 9:
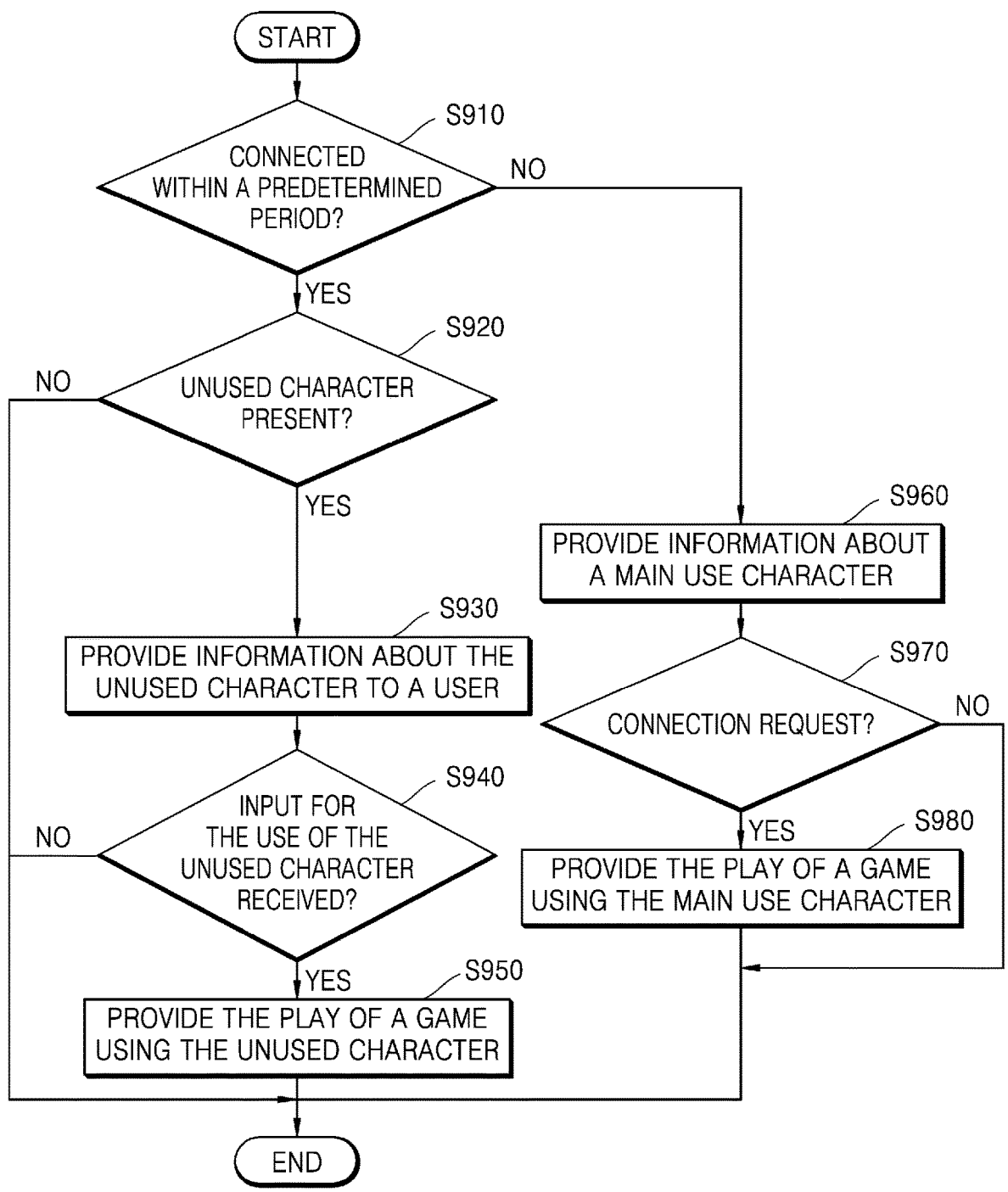
FIG. 9 is a flowchart illustrating a method of providing a game that is performed in an apparatus for providing a game according to an embodiment.

FIG. 9 is a flowchart illustrating a method of providing a game that is performed in an apparatus for providing a game according to an embodiment.

The method of providing a game according to the embodiment shown in FIG. 9 includes the steps that are performed in a time-series manner by the apparatus 100 for providing a game shown in FIGS. 1 and 2. Accordingly, the descriptions that will be omitted below but have been given above in conjunction with the apparatus 100 for providing a game shown in FIGS. 1 and 2 may also be applied to the method of providing a game according to the embodiment shown in FIG. 9.

As shown in FIG. 9, the apparatus 100 for providing a game may determine whether a user in question is a user who connects within a predetermined period at step S910.

If, as a result of the determination at step S910, the user is a user who connects within a predetermined period, the apparatus 100 for providing a game may perform step S920.

At step S920, the apparatus 100 for providing a game may determine whether an unused character is present among a plurality of user characters. The apparatus 100 for providing a game may determine whether an unused character is present based on the usage rates of characters, and may determine a character having a usage rate lower than a predetermined reference value to be an unused character.

If, as a result of the determination at step S920, it is determined that an unused character is not present, the apparatus 100 for providing a game may end the process.

If, as a result of the determination at step S920, it is determined that an unused character is present, the apparatus 100 for providing a game may proceed to step S930.

At step S930, the apparatus 100 for providing a game may provide information about an unused character to the user. The apparatus 100 for providing a game may provide information about an unused character to a user using a character selection window, and may provide an alarm through a separate message. Furthermore, apparatus 100 for providing a game may also represent an unused character by applying an effect (a frozen effect, a sleeping effect, or the like) to an image of the unused character. Moreover, the apparatus 100 for providing a game may calculate unconnected periods and provide information about the unconnected periods together with the unconnected periods.

At step S940, the apparatus 100 for providing a game may check whether a use input for the unused character is received from a user.

If, as a result of the determination at step S940, it is determined that the use input for the unused character is received, the apparatus 100 for providing a game may proceed to step S950.

The apparatus 100 for providing a game proceeds with the game using the unused character.

If, as a result of the determination at step S940, the use input for the unused character is not received within a predetermined period, the apparatus 100 for providing a game may end the process.

Meanwhile, if, as a result of the determination at step S910, the user is a use who is not connected within a predetermined period, the apparatus 100 for providing a game may proceed to step S960.

Since the user is a long-term unconnected user, the apparatus 100 for providing a game may identify a main use character previously played by the user, and may provide information about the main use character at step S960.

At step S970, the apparatus 100 for providing a game may check whether a connection request is received from a long-term unconnected user.

If, as a result of the checking at step S970, a connection request has not been received from the corresponding user for a predetermined period, the apparatus 100 for providing a game ends the process.

If, as a result of the checking at step S970, a connection request has been received from the corresponding user for the predetermined period, the apparatus 100 for providing a game proceeds to step S980.

At step S980, the apparatus 100 for providing a game provides the play of a game using the main use character, and ends the process.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Each of the functions provided in components and 'unit(s)' may be coupled to a smaller number of components and 'unit(s)' or divided into a larger number of components and 'unit(s).'

In addition, components and 'unit(s)' may be implemented to run one or more CPUs in a device or secure multimedia card.

The method of providing a game according to the embodiment described with reference to FIG. 9 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method of providing a game according to the embodiment described with reference to FIG. 9 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method of providing a game according to the embodiment described with reference to FIG. 9 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

According to some of the embodiments, there are proposed the apparatus and method for providing a game, which may encourage the use of a character having a low usage rate.

According to some of the embodiments, there are proposed the apparatus and method for providing a game, which may increase the utilization of character resources that are provided in a game.

According to some of the embodiments, there are proposed the apparatus and method for providing a game, which may secure the diversity of characters in a game by allowing a user to use various character resources.

The scope of protection pursued via the present specification should be defined by the attached claims, rather than the detailed description. All modifications and variations which can be derived from the meanings, scopes and equivalents of the claims should be construed as falling within the scope of the present invention.

What is claimed is:

1. An apparatus for providing a game, the apparatus comprising:
    a storage configured to store information about a plurality of held characters held by a user in a game;
    a display; and
    a controller configured to determine an unused character among the plurality of held characters, and display, with the display, information corresponding to the unused character to the user,
    wherein the controller is further configured to:
        search a connection history of the user for the game,
        determine whether the user is a long-term non-connecting user who has not connected to the game for a predetermined period, based on the connection history of the user for the game,
        when the user is a long-term non-connecting user, determine the unused character as a character with a character usage rate equal to or larger than a predetermined reference value, and
        when the user is not a long-term non-connecting user, determine the unused character as a character with the character usage rate lower than the predetermined reference value,
        classify an unconnected period as one of two or more types of unconnected periods based on a final access date for the unused character, and
        provide, with the display, at least one visual indication configured to encourage play using the unused character for the respective types of unconnected periods,
    wherein the character usage rate is calculated according to character usage time and game access time, and
    wherein the controller is further configured to:
        provide, with the display, the at least one visual indication configured to encourage play using the unused character for the respective types of unconnected periods to the user when the user accesses the game and prior to generating and displaying a character select screen, and
        in response to a selection by the user on the at least one visual indication to join the game using the unused character, join the user to the game with the unused character without generating and displaying the character select screen.

2. The apparatus of claim 1, wherein the at least one visual indication comprises a displayed alarm.

3. The apparatus of claim 1, wherein the controller is configured to provide, with the display, the at least one visual indication in a character selection window.

4. The apparatus of claim 1, wherein the controller is further configured to apply and display, with the display, a visual effect that represents non-use of the unused character to the unused character.

5. The apparatus of claim 1, wherein the controller is configured to calculate an unused period for the unused character and provide, with the display, information about the calculated period to the user.

6. The apparatus of claim 1, wherein when the unused character includes a plurality of unused characters, an unused character to be recommended to the user is selected from among the plurality of unused characters, and information requesting use of the unused character is provided to the user.

7. The apparatus of claim 6, wherein the controller is further configured to:
    select at least one from among an unused character having a highest play reward rate, an unused character having a highest growth speed, an unused character having a longest unconnected period, an unused character having a shortest unconnected period, an unused character having highest suitability for a play style of the user, and an unused character having an event in progress; and
    recommend the unused character by displaying, with the display, the at least one visual indication.

8. The apparatus of claim 1, wherein the controller is further configured to initiate play while using a unused character when the unused character is selected by the user.

9. The apparatus of claim 1, wherein the controller is further configured to receive a selection of a main use character from among the plurality of held characters from the user, and calculate a play time that is taken for the unused character to reach a growth level of the main use character, and display, with the display, the calculated play time.

10. The apparatus of claim 1, wherein the controller is further configured to provide, with the display, information corresponding to a main use character to the user when the user has not been connected for the predetermined period and a condition set for the main use character by the user is satisfied.

11. A method of providing a game, the method being performed by an apparatus for providing a game, the method comprising:
    determining an unused character among a plurality of held characters for a user having the plurality of held characters; and
    providing, with a display, information about the unused character to the user,
    wherein a usage rate is calculated according to character usage time and game access time, and wherein determining the unused character comprises:
  searching a connection history of the user for the game;
  determining whether the user is a long-term non-connecting user who has not connected to the game for a predetermined period, based on the connection history of the user;
  based on determining that the user is a long-term non-connecting user, determining a character with a character usage rate equal to or larger than a predetermined reference value as the unused character; and
  based on determining that the user is not a long-term non-connecting user, determining a character with the character usage rate lower than the predetermined reference value as the unused character,
wherein providing, with the display, the information about the unused character to the user comprises:
  classifying an unconnected period as one of two or more types of unconnected periods based on a final access date for the unused character, and
  providing, with the display, at least one visual indication configured to encourage play using the unused character for the respective types of unconnected periods,
wherein the method further comprises:
  providing, with the display, the at least one visual indication configured to encourage play using the unused character for the respective types of unconnected periods to the user when the user accesses the game and prior to generating and displaying a character select screen, and
  in response to a selection by the user on the at least one visual indication to join the game using the unused character, joining the user to the game with the unused character without generating and displaying the character select screen.

12. The method of claim 11, wherein the at least one visual indication comprises a displayed alarm.

13. The method of claim 11, wherein providing, with the display, the information about the unused character to the user comprises displaying, with the display, information about non-use of the unused character in a character selection window.

14. The method of claim 11, further comprising, after providing, with the display, the information about the unused character to the user, initiating play while using a selected unused character when the unused character is selected by the user.

15. The method of claim 11, wherein determining the unused character further comprises selecting a character that satisfies a condition set for a main use character by the user when the user has not been connected for the predetermined period.

16. The method of claim 15, wherein providing, with the display, the information about the unused character to the user comprises providing information about the main use character to the user.

17. A non-transitory computer-readable storage medium having stored thereon a computer program that, when executed by a processor, causes the processor to execute the method of claim 11.

* * * * *